United States Patent
Huomo et al.

(10) Patent No.: US 8,005,426 B2
(45) Date of Patent: *Aug. 23, 2011

(54) METHOD AND MOBILE TERMINAL DEVICE INCLUDING SMARTCARD MODULE AND NEAR FIELD COMMUNICATIONS MEANS

(75) Inventors: Heikki Huomo, Graz (AT); Olli Immonen, Helsinki (FI); Mia Lahteenmaki, Helsinki (FI); Kimmo Ramo, Espoo (FI)

(73) Assignee: Nokia Corporation, Espoo (FI)

( * ) Notice: Subject to any disclaimer, the term of this patent is extended or adjusted under 35 U.S.C. 154(b) by 604 days.

This patent is subject to a terminal disclaimer.

(21) Appl. No.: 11/817,957

(22) PCT Filed: Mar. 7, 2005

(86) PCT No.: PCT/IB2005/000571
§ 371 (c)(1),
(2), (4) Date: Jun. 30, 2008

(87) PCT Pub. No.: WO2006/095212
PCT Pub. Date: Sep. 14, 2006

(65) Prior Publication Data
US 2009/0098825 A1    Apr. 16, 2009

(51) Int. Cl.
*H04B 7/00* (2006.01)
(52) U.S. Cl. ............ 455/41.2; 235/441
(58) Field of Classification Search .......... 455/41.2; 235/441
See application file for complete search history.

(56) References Cited

U.S. PATENT DOCUMENTS

| 5,146,068 A | 9/1992 | Ugawa et al. |
| 7,110,792 B2 * | 9/2006 | Rosenberg ............ 455/558 |
| 7,775,442 B2 * | 8/2010 | Saarisalo ............ 235/487 |
| 2003/0085286 A1 | 5/2003 | Kelley et al. |
| 2003/0087601 A1 | 5/2003 | Agam et al. |
| 2003/0171993 A1 | 9/2003 | Chappuis |

FOREIGN PATENT DOCUMENTS

| WO | 2004-105359 A2 | 12/2004 |
| WO | 2005/008575 A1 | 1/2007 |

OTHER PUBLICATIONS

Communication issued Nov. 15, 2010 in European Application No. 05718190.1-2414, 5pp.

* cited by examiner

*Primary Examiner* — Yuwen Pan
(74) *Attorney, Agent, or Firm* — Locke Lord Bissell & Liddell (57) ABSTRACT

According to the present invention, a method for controlling a mobile terminal device is provided, wherein said device comprises a smartcard module and a near field communication module. In a first operation a smartcard operation on said mobile terminal device is started which results in an activation or switching on of said smartcard module. The smartcard application may be started by a user or based on the location of said mobile terminal device. That is the case for instance if the mobile terminal device is located in the area of a point of sales terminal, the smartcard application will automatically starts. Further, time controlled starting of certain applications is conceivable. Then it may be determined if said started smartcard application is an application for performing data transactions with external entities and in case of an affirmative determination a connection between said smartcard module and said NFC-module will be activated.

29 Claims, 8 Drawing Sheets

METHOD AND MOBILE TERMINAL DEVICE INCLUDING SMARTCARD MODULE AND NEAR FIELD COMMUNICATIONS MEANS

FIELD

The present invention relates to the field of control of mobile terminal devices which are equipped with smartcard and near field communications means.

Generally, the present invention addresses the field of local communication technology, such as those short-range communications technologies involving electromagnetic/electrostatic-coupling technologies and optical short-range communication technologies, namely near field communication technologies (NFC). In one possible embodiment of the NFC, electromagnetic and/or electrostatic coupling is implemented in the radio frequency (RF) portion of the electromagnetic spectrum, using for example radio frequency identification (RFID) technology, which primarily includes radio frequency identification (RFID) transponders also denoted as radio frequency (RFID) tags and radio frequency transponder readers also denoted for simplicity as radio frequency (RFID) readers.

BACKGROUND

Radio frequency identification (RFID) transponders are widely used for labeling objects, to establish person's identities and to recognize objects provided with radio frequency identification (RFID) transponders. Basically, radio frequency identification (RFID) transponders include an electronic circuit with data storage capacity and a radio frequency (RF) interface and high frequency (HF) interface, respectively, which couples an antenna to the electronic circuit. The radio frequency identification (RFID) transponders are typically accommodated in small containers. Depending on the requirements made on the deployment of the radio frequency identification (RFID) transponders (i.e. the data transmission rate, energy of the interrogation, transmission range etc.) different types are provided for data provision and transmission on different radio frequencies, for example within a range from several 10-100 kHz to some GHz, respectively, (e.g. 134 kHz, 13, 56 MHz, 860-928 MHz etc; only for illustration).

Two main classes of radio frequency identification (RFID) transponders can be distinguished, i.e. active and passive transponders. Passive radio frequency identification (RFID) transponders are activated by radio frequency identification (RFID) transponder readers generating an interrogation signal, for example a radio frequency (RF) signal at a certain frequency. Active radio frequency identification (RFID) transponders comprise their own power supplies such as batteries or accumulators for energizing.

Payment and ticket applications are considered as one of the most important emerging usage areas that will leverage in radio frequency identification (RFID) technology. For instance, a portable terminal such as a mobile phone implementing a radio frequency identification (RFID) transponder may be utilized to provide/present a digitally coded or electronic ticket, which has been obtained before, to a ticket checkpoint system of an entrance of a public transportation system. The digitally coded ticket is read out by corresponding radio frequency identification (RFID) reader, with which the checkpoint system is equipped, and is analyzed thereby. In case of validity of the digitally coded ticket the access to the public transportation system is granted to the owner of the portable terminal. The digitally coded tickets are not necessarily only a piece of code. They may also include authentication information, such as for instance in case of 30 travel tickets, wherein the actual purchase of a ticket may need to be included in the ticketing application, so that an inspector notices that the person has actually purchased those tickets.

Advantageously, such a ticket checkpoint system may be available for public transportation systems in various cities, which may result in the requirement for coding different digitally coded tickets. Moreover the illustrated ticket checkpoint system may be extended to similar digitally coded records such as credit card information, loyalty card information, cinema tickets and the like, where the portable terminal performs information exchange with the very same equipment, e.g. point-of-sale equipment. The same applications may be realized by using visual codes presented by a visual encoding means and a visual scanning means allowing for reading-out the visual codes from the visual encoding means.

In combination with the above-mentioned technology the usage of smartcards is steadily growing. Modern smartcards provide application developer with a secure and tamperproof environment for developing high value, secure and complex applications. Said smartcards include a central processing unit as well as secure memory areas making unwanted access by third parties very difficult. Further, cryptographic means are provided within the smartcard, which opens the deployment of smartcards for secure applications like banking or even personal identification applications.

Usually, smart cards create a secure environment for storing items of monetary value while the contactless feature is fast and convenient for users who only need to bring the card in close proximity to a card reader. These types of contactless cards do not require a Personal Identification Number (PIN) and are therefore suited for high-volume, low-value transactions. Users of the card can load value onto the card by using an Automated Teller Machine (ATM) or a kiosk to transfer money from a checking account, savings account, a credit card account or by inserting cash into the ATM. The user puts their ATM card or cash into the machine and positions a contactless card near the contactless reader/writer to complete the transfer of money. These ATMs are typically located at the entrance to the transit station where the customers purchase transit tokens. The popularity of contactless cards for transit has grown so that other vendors in area surrounding the transit system also accept the contactless card for payment for purchases such as parking, fast food, convenience stores, gas stations and vending machines. Many merchants are installing contactless smart card reader/writers in their stores to provide the ability to accept smart cards as a form of payment. It shall be appreciated that the above-mentioned embodiments regarding smartcards are only given to explain possible deployments of smartcards without any limiting intention. It is also imaginable that smartcards may be used in connection with credit card and debit transactions with dynamic value, for instance.

The idea of adding a smartcard into a mobile phone or a user device in combination with a contactless reader/writer is well known in the state of the art, but there is a need for providing the user with controlling means for said smartcard and also with means for controlling said contactless device. Actual embodiments of smartcard phones or mobile phones having a smartcard module respectively does not provide the user with a full control interface, so that fraudulent or undesired behavior can not be prohibited or noticed by a user of said phone.

SUMMARY

The present invention provides a method and device to provide a user of a mobile device adapted to perform NFC data transaction with a full control interface, so that fraudulent or undesired events are eliminated. The present invention provides arrangements and systems, which allow performing above stated methodology.

According to a first aspect of the present invention, a method for controlling a mobile terminal device is provided, wherein said device comprises a smartcard module and a near field communication module. In a first operation a smartcard operation on said mobile terminal device is started which results in an activation or switching on of said smartcard module. The smartcard application may be started by a user or based on the location of said mobile terminal device. That is the case for instance if the mobile terminal device is located in the area of a point of sales terminal, the smartcard application will automatically start. Further, time controlled starting of certain applications is conceivable. Then it may be determined if said started smartcard application is an application for performing data transactions with external entities and in case of an affirmative determination a connection between said smartcard module and said NFC-module will be activated. Thereby the activated NFC-module is now ready to provide data transmissions, for instance.

According to another embodiment of the present invention, said authorization step is based on user input. Thus, full control of said device is provided.

According to an embodiment of the present invention, said activating of said smartcard module is based on performing an authorization step for activating functionality of said smartcard module. Thereby, privacy and security for certain smartcard applications is ensured.

According to another embodiment of the present invention, said activated smartcard module is accessible only for a predefined time. Thus, accidental activation of said smartcard module is prohibited because the smartcard module and also the NFC module will deactivate after a certain time period. Further, said time period may be set by a authorized user of said mobile device.

According to another embodiment of the present invention, said activating of said smartcard module is based on user input by means of a graphical user interface (GUI).

According to another embodiment of the present invention, said connection between said smartcard module and said NFC module is disabled if said smartcard application corresponds to an internal application. If an internal application was selected by the user the NFC module is deactivated for preventing unauthorized usage of said NFC module.

According to another embodiment of the present invention, said activating of said smartcard module is automatically provided by means of the mobile terminal control unit (MCU). Thereby, no user input is necessary to activate said module resulting in a convenient handling of said mobile device.

According to another embodiment of the present invention, said starting of said smartcard application is provided depending on the environment of said device. Thus, if the mobile device is located near a point of sales terminal, for instance, a payment application will automatically start. Said detection of the environment of said device may also environment may be triggered by a user "touching" a tag near a point of sale terminal, or detected by means of a e.g. a GPS device or though other location determination means within said mobile device.

According to another embodiment of the present invention, said data transactions are wireless data transactions with a second party, said transactions are provided in a NFC communication environment. In this manner said mobile device is adapted to perform different applications requiring data exchanging between two or more parties or the like.

According to another embodiment of the present invention, performing of said wireless data transmission further comprises receiving notification from said second party and sending acknowledgement data to said second party, both corresponding to said wireless data transmission in question. By receiving notification data from said second party, each data transaction performed by said mobile device may be traced back.

According to another embodiment of the present invention, said method further comprises the steps of: obtaining at least one digital receipt corresponding to each said wireless data transaction executed with said second party, storing said at least one digital receipt in a storage, collecting all digital receipts during a predetermined time period in said storage, receiving a overall digital receipt from a service providing party, wherein said overall digital receipt is accumulated by said service providing party during said predetermined time period, and comparing said collected digital receipts with said received overall digital receipt from a service providing party.

According to another embodiment of the present invention, said digital receipt and said overall digital receipt comprise at least one of date and time information data, credit card balance data, shopping receipts in connection with a certain merchant or the like. Due to said comprised data it is possible to assign each receipt to a certain transaction. This data can be compared with the conventional credit card company monthly invoice e.g. without need to store paper receipts.

According to another embodiment of the present invention, said comparing is provided for each transaction on a real time basis. That is, it is possible to check the receipt stored on the service providing side with the actual received receipt without any timing delays.

According to another embodiment of the present invention, said method further comprises forwarding said received overall digital receipt and said collected digital receipts to another entity. Thereby, said another entity provides the functionality of a third party entity, wherein said party provides a certificated and secured data storage system, for instance.

According to another aspect of the present invention, a computer program product is provided, which comprises program code sections stored on a machine-readable medium for carrying out the operations of the method according to any aforementioned embodiment of the invention, when the computer program product is run on a processor-based device, a computer, a terminal, a network device, a mobile terminal, or a mobile communication enabled terminal.

According to another aspect of the present invention, a computer program product is provided, comprising program code sections stored on a machine-readable medium for carrying out the operations of the aforementioned method according to an embodiment of the present invention, when the computer program product is run on a processor-based device, a computer, a terminal, a network device, a mobile terminal, or a mobile communication enabled terminal.

According to another aspect of the present invention, a software tool is provided. The software tool comprises program portions for carrying out the operations of the aforementioned methods when the software tool is implemented in a computer program and/or executed.

According to another aspect of the present invention, a computer data signal embodied in a carrier wave and representing instructions is provided which when executed by a processor causes the operations of the method according to an aforementioned embodiment of the invention to be carried out.

According to yet another aspect of the present invention, a mobile terminal device enabled for performing wireless data transactions is provided. Said device comprises a smartcard module, wherein said smartcard module is only accessible after user authentication and for a certain period of time, a Near Field Communication (NFC) module, a memory module, means for starting a smartcard application on said mobile terminal device resulting in activating of said smartcard module, means for determining if said started smartcard application is an application for performing data transactions with external entities; means for switching on said NFC-module in case of an affirmative determination; and a central processing unit (CPU, MCU) interconnecting said mobile telecommunications module, said smart card module, said NFC module and said memory module, wherein said CPU is adapted for controlling operation of said mobile device.

According to yet another embodiment of the present invention, said mobile terminal device further comprises means for obtaining at least one digital receipt corresponding to each said wireless data transaction executed with said second party, means for storing said at least one digital receipt in a storage, means for collecting all digital receipts during a predetermined time period in said storage, means for receiving an overall digital receipt from a service providing party, wherein said overall digital receipt is accumulated by said service providing party during said predetermined time period, and means for comparing said collected digital receipts with said received overall digital receipt from a service providing party.

According to yet another embodiment of the present invention, said device further comprises a clock module for controlling all time-oriented events within said device.

According to yet another embodiment of the present invention, said device further comprises a telecommunications module for connecting to a cellular radio network for receiving the overall digital receipt from a service providing party. By means of said telecommunications module said device is adapted to use existing cellular networks, for instance to receive different data, like receipts or the like.

According to yet another embodiment of the present invention, said device further comprises a receipt storage embedded within said smartcard module for storing transaction related data.

According to yet another embodiment of the present invention a wireless data transaction system is provided. Said system comprises at least one mobile terminal device and a plurality of external entities, wherein said mobile terminal devices are adapted to provide bidirectional data transactions with said external entities.

According to yet another aspect of the present invention, a smartcard module is provided, said module comprises: a smartcard control unit, a secure storage area module, a first interface, wherein said first interface is a power on interface, and a second interface, wherein the second interface is a communication interface.

According to yet another embodiment of the present invention, said first interface is controllable by a timer module. Thus, a time-based operation of said first interface is enabled. Further, it is imaginable that said first device will be power on automatically on a time based manner.

According to yet another embodiment of the present invention, said second interface is controllable by an application selection switching between a mobile terminal control unit interface and a near field communication interface. Thus it is possible to switch between a external application and a internal application. Said external application may be provided by means of said NFC interface and said internal application uses said mobile terminal device control unit CPU. Further, it is imaginable that said internal application may be conducted by means of a GSM/UMTS interface, or the like.

DESCRIPTION OF THE FIGURES

Advantages of the present invention will become apparent to the reader of the present invention when reading the detailed description referring to embodiments of the present invention, based on which the inventive concept is easily understandable.

Throughout the detailed description and the accompanying drawings same or similar components, units or devices will be referenced by same reference numerals for clarity purposes.

It shall be noted that the designations portable device, mobile device and portable consumer electronic (CE) are used synonymously throughout the description.

The accompanying drawings are included to provide a further understanding of the invention and are incorporated in and constitute a part of this specification. The drawings illustrate embodiments of the present invention and together with the description serve to explain the principles of the invention. In the drawings.

DISCUSSION OF EXAMPLE EMBODIMENTS OF THE INVENTION

Figure 1:
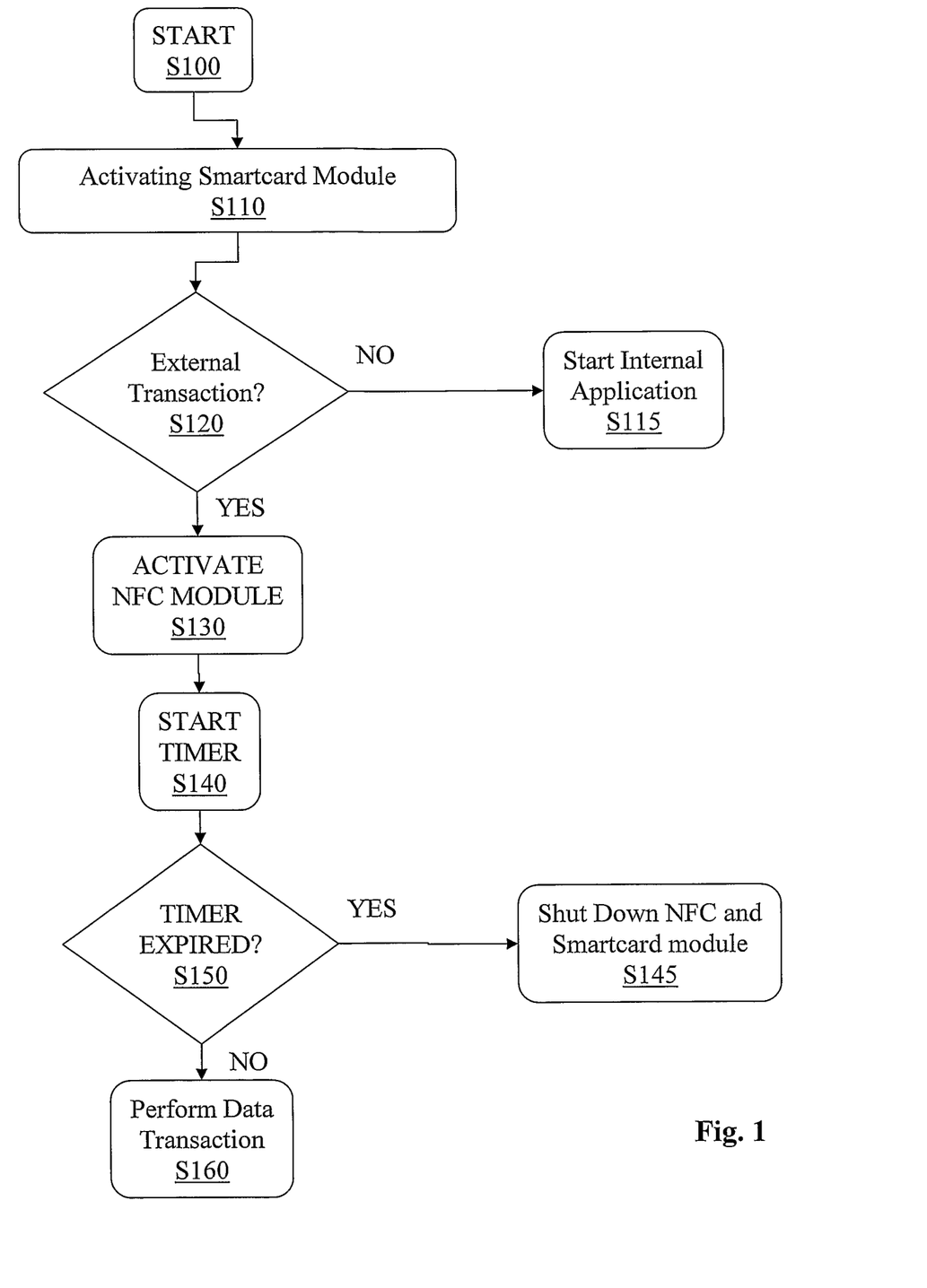
FIG. 1 illustrates a basic operational sequence to be operated by a mobile terminal device according to an embodiment of the present invention.

With reference to FIG. 1, a basic operational sequence of a method for controlling a mobile terminal device in accordance with one embodiment of the present invention is illustrated. In a first operational step S100 the method for controlling a mobile device is started, wherein a user, for instance, activates or starts a smartcard application. For instance a user wants to perform a payment or banking application, thus it is necessary that said device provides a secure/tamperproof environment. According to embodiments of the present invention, the smartcard application may be activated by the user through a user interface (UI) interface of the mobile terminal device, or alternatively the activation of the smartcard application may be performed by a mobile controlling unit (MCU) based on e.g. environmental conditions of the mobile terminal device.

In response to the activation of the smartcard application, a secure smartcard module containing secure/tamperproof data is powered on as indicated in an operational S110, which may be controlled by a timer, for instance.

In a conditional operation S120 the mobile terminal device will determine if said started application is an external application for performing transactions with external entities like a point of sales terminal (POS) for instance. Said transaction shall be provided by means of a NFC module included within said device. If the user chooses an internal application, corresponding to the NO branch of the operation S120, said internal operation will be started. The internal operation may correspond for instance to an internal smartcard management operation, wherein a user controls the data stored on the card, or the like.

If an external application is selected according to the YES branch of the conditional operation S120, a connection between the secure smartcard module and the NFC module will be activated, as shown with reference to the operational step S130, wherein a connection between said smartcard module and said NFC module is activated. Thereby, said mobile terminal device is enabled to communicate with external entities via said NFC module. The controlling of said NFC module may optionally be provided by said (MCU) or for instance by said smartcard module.

After activating said NFC module said mobile device is now able to perform wireless data transaction by means of the NFC module in connection with the smartcard module. The mobile device provides a tamperproof environment within the smartcard and the data communication between the connected parties may be anyway encrypted or coded. The smartcard application is not directly accessible from the outside; thereby it can serve as a platform for complex and sensitive applications, such as, for example banking applications and credit card transactions, for instance.

To ensure security and control in various embodiments of the present invention, including embodiments where, either the secure smartcard module, or both the secure smartcard module and the NFC module were accidentally activated, and embodiment where a NFC-based transaction was conducted, a timer will be started, corresponding to an operation S140. The timer measures the elapsed time within the NFC module and the smartcard application are activated. This step may be provided because of security issues. If the predetermined timer value expires, that corresponds with the YES branch of the conditional operation S150 leading to an operation where, either the secure smartcard module, or the connection between the secure smartcard module and the NFC module will be shut down. This procedure provides maximum security for a user carrying said mobile device, because it prevents accidental or false usage of a sensitive application by means of said smart card. Additionally, if either the secure smartcard module, or the connection between the secure smartcard module and the NFC module is deactivated, there is no possibility to access the smartcard by an impostor, who tries to hack the device.

If the timer value lies within a desired value the wireless data transaction according to user input will be started, S160 and the operational sequence will come to the end. The above-mentioned operational steps may be restarted, corresponding to a new iteration.

Figure 2A:
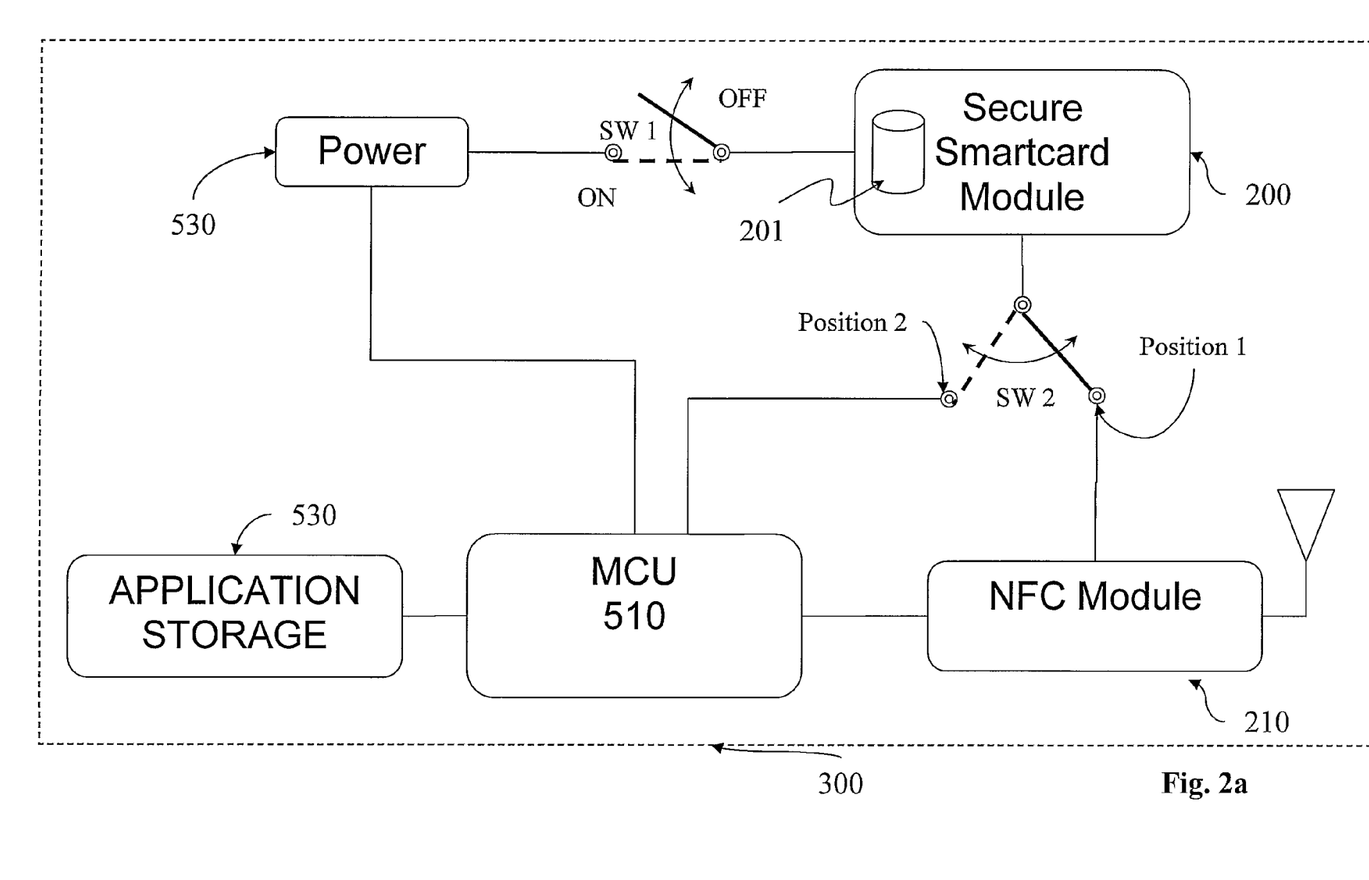
FIG. 2a illustrates schematically an example arrangement of a smartcard module and a NFC module in connection with other elements within a mobile device according to an embodiment of the present invention.

FIG. 2a illustrates schematically an example arrangement of a smartcard module and a NFC module in connection with other elements within a mobile device according to an embodiment of the present invention.

According to an embodiment of the present invention a secure smart card element 200 is integrated into a mobile device (not shown in FIG. 2a), which is schematically illustrated with reference to FIG. 3. Said smartcard module 200 may also comprise a secure storage area module 201. Said secure storage module 201 may be used for storing different data in a tamperproof environment on the smartcard. Said data may comprise secure applications, private data, important receipts or the like. As illustrated, the secure smart card element 200 is connected to a power source via a user controllable switch SW1, which provides necessary power to the secure smart card element for powering it up or shutting it down. The secure smart card element 200 is further connected via a switch SW2 either to a Near Field Communication (NFC) interface 210 providing collectivity with external devices by means of using e.g. RFID or optical connection, or alternatively to terminal MCU (510) for providing control to the secure smart card element 200. It should be noted that the term mobile control unit (MCU) and central processing unit (CPU) are used synonymously throughout the description.

The NFC interface 210 provides necessary means to communicate with external tags/devices using e.g. RFID technology so that the terminal can conduct RFID-based payment and ticketing transactions, but not limited thereto. The NFC interface 210 allows both reading and writing operations to be conducted both to and from external tags/devices and also peer-to-peer type communication between two NFC terminals. The secure smart card element 200 is directly linked to the NFC interface 210, by means of said switch SW2, in order to ensure that there will be no unnecessary delays within terminal logic that might hinder/prevent transactions due to the nature or RFID communication, which will typically require fast response times. A RFID transaction, for instance, will be typically conducted within hundreds of milliseconds.

Figure 3:
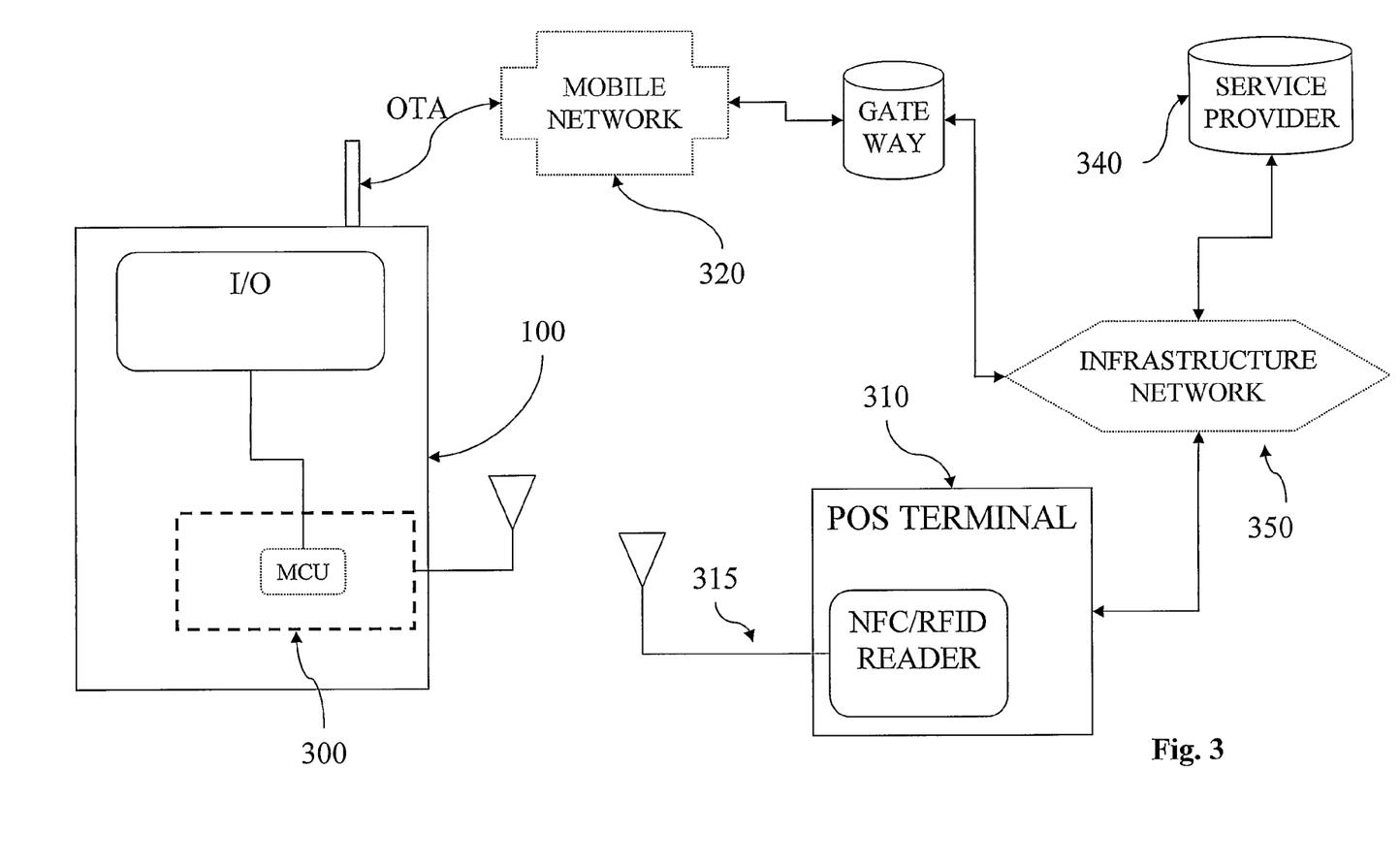
FIG. 3 illustrates an exemplary operational environment that would benefit from the embodiments of the present invention in connection of said example arrangement within a mobile device.

With reference to FIG. 3, the mentioned key components used for controlling the smartcard module 200 or element, respectively and said NFC module 210 or element are summarized with reference to the reference sign 300.

The terminal MCU 510 is responsible for directing overall terminal operations and executing various applications. In connection with the MCU there is application/application interface storage 530, which is responsible for maintaining available applications/application interfaces for the MCU 510 to execute.

The following describes the operation of the above-mentioned switches SW1 and SW2. The power switch SW1 enables the user of the mobile terminal (or MCU based on certain conditions) to control the operation of the secure smart card element 200, so that the secured applications in the secure smart card element 200 cannot be contacted without user or MCU control. Thus, when a user wants to interact/activate secure applications stored at the secure smart card element 200, the switch may be activated by selecting e.g. secure applications from terminal user interface (UI), which closes the switch SW1 to activate the secure smart card element. The power switch SW1 may be preferably associated with a timer, which opens the switch SW1 (shuts the secure smart card element down) after certain predefined (user-selectable) time period (time can be e.g. 15, 30, 45, or 60 sec), which ensures that the secure smart card element 200 will not be active unintentionally or accidentally. The user may be provided with a UI interface for selecting suitable timer condition to be used as a default control for shutting down the secure smart card element 200. Further, the MCU 510 might be able to provide indications that the secure smart card element is active and postpone the starting point of the timer, for instance.

The activation of the secure smart card element may be done without certain authorization steps. Authorization is typically done by requesting certain PIN code from the terminal user in order to activate the secure smart card element 200. When user selects e.g. "mobile payment applications" from the terminal UI, the authorization PIN is requested and if correct PIN is entered, the secure smart card element 200 is activated and mobile payment applications are active. The user may also be provided with a chance to change the PIN code. If the user fails to provide the necessary PIN code subsequently for e.g. three times, the secure smart card element will be permanently closed unless a higher level authorization code (compare to SIM and PUK codes in GSM) is entered to re-activate the secure smart card element 200. This code could be provided to all users in a separate medium and if necessary, users may request that code from a service provider (e.g. transaction authorization entity) in response of providing valid authentication.

The internal/external switch SW2 enables the user of the terminal (selected application) to control the current operation/interface of the secure smart card element 200. If e.g. a mobile payment application is initiated, the switch SW2 is set to activate the NFC interface 210 to enable communication with external sources, corresponding to a Position 1 of switch SW2, such as, for example conducting payment/ticketing transactions with using the secure applications at the secure smart card element 200. The user of the mobile terminal may also be provided with an interface to select only certain applications of the applications to be active, so that the secure smart card element is powered but only certain secure transaction applications may be active. Said operation may also be controlled by the MCU, based on the active applications and context or present environment of the terminal to ensure that only preferred applications will be available. Selection of the applications is based on software control so that the set of available applications at a time is controllable either by a user of the mobile terminal for example by way of selecting certain applications to be open, or by the MCU based on a current context of the terminal. With this kind of functionality, an external source (e.g. a POS terminal 310 or like) cannot "scan" all the applications residing in the secure smart card element 200, which enhances the security and anonymity aspects of the present invention.

If the internal/external switch SW2 is set to internal communication, corresponding to Position 2, the switch SW2 allows a user of said mobile terminal to interact with the secure applications at the secure smart card element, without an active NFC module 210. This interaction might include reading log information from the applications and interacting with the applications. The secure smart card element is capable of maintaining a log keeping record of each transactions (e.g. Mar. 3, 2005; 25.50 USD; Department store: Safeway etc.) relating to the payment/ticketing transactions. When the switch SW2 is set to internal communication, the user is capable of viewing the information relating to the conducted transactions and control the applications at the secure smart card element 200, by means of a graphical user interface, for instance.

Figure 2B:
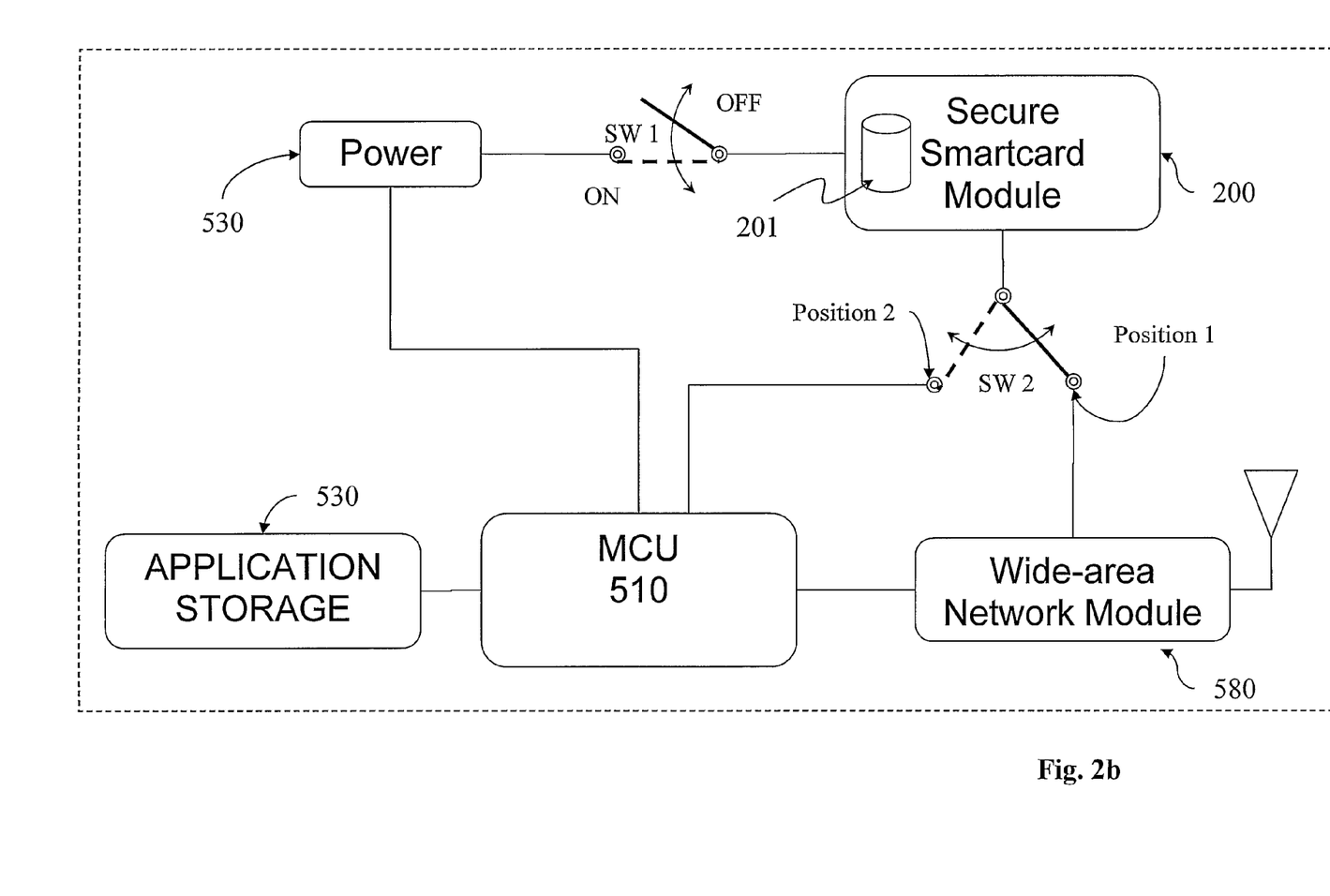
FIG. 2b illustrates schematically an example arrangement of a smartcard module and a wide-area communication module in connection with other elements within a mobile device according to an embodiment of the present invention.

FIG. 2b illustrates schematically an example arrangement of a smartcard module and a wide-area communication module in connection with other elements within a mobile device according to an embodiment of the present invention.

According to this embodiment of the present invention a secure smart card element 200 is integrated into a mobile device (also not shown in FIG. 2b), which is schematically illustrated with reference to FIG. 3. The embodiment of the present invention which is depicted with reference to FIG. 2b provides an analogous functionality like the embodiment described with reference to FIG. 2a. The main difference between those to embodiments is the interface which is adapted to communicate with external entities. The embodiment described with reference to FIG. 2a uses a NFC communication environment wherein the embodiment, which is depicted in FIG. 2b, uses a wide-area network interface 580. Said interface 580 is described in detail in the following.

In this particular embodiment all data transactions are provided by means of said wide-area network interface 580, and said smartcard module 200 serves as a tamperproof processing and storage unit. Said smartcard module 200 may provide said mobile terminal device with a secure and tamperproof environment, which may be used for encoding or encrypting respectively transaction related data or the like. It should be noted that the example arrangement of a smartcard module and a wide-area communication module in connection with other elements within a mobile device presented in FIG. 2b is added here only for the purpose of illustrating that according to one embodiment of the present invention, also wide-area connection based transactions are applicable for the present invention. It should be further noted that when transaction data is to be communicated through a wide-area connection, the data is to be subjected for encoding and modulation for formatting the data into a format compatible with wide-area network communication protocol. Thus, according to embodiments of the present invention, the data provided by the secure smart card element 200 will be provided to the wide-area network module 580 through various processing steps controlled by the MCU 510 as the data from secure smart card element need to be formatted to comply with wide-area networking format and there is no time-requirements in contrast to the NFC communication environment. Therefore, according to embodiments of the present invention, the position of switch SW2 of FIG. 2a could be set to internal communication when a user of the wireless terminal prefers wide-area communication network based transactions instead of having a separate switch position as illustrated in FIG. 2b.

FIG. 3 illustrates an exemplary operational environment that would benefit from the embodiments of the present invention, wherein a mobile terminal 100 provides local or remote transactions by means of the secure smart card element 200 described above.

In case that a user wants to conduct a NFC based transaction with a local point-of-sale (POS) terminal 310, comprising a NFC communication module 315, the user (or the terminal MCU 510) provides the necessary authentication to activate the secure smart card element 200 (i.e. provides the personal PIN code), and may further select at least one of the transaction/applications to be active at the time. The selection may be based on e.g. default selection, based on user selection or alternatively the terminal 100 may be capable of selecting the suitable application based on the current context/environment of the terminal 100. The selection of the context/environment of the terminal 100 may be performed by the user e.g. reading a dedicated tag through the NFC module 210, wherein the tag could indicated the presence of certain type of POS terminal (e.g. local merchant having a contract with certain credit card company and also private loyalty card for the store), so that corresponding applications can be activated. The selection of the context/environment may alternatively be based on the current location of the mobile terminal, which may be based on GPS positioning information or alternatively information received through wide-area- or local-area networks.

Afterwards, when the amount of payment and other related information is negotiated (this "negotiation" means that user of the terminal 100 and the transaction provider have mutually agreed the amount of payment), the user simply "touches" (i.e. brings his mobile terminal device in close proximity) the POS terminal NFC interface with the terminal 100, which results the terminals NFC interface to communicate with the POS terminals 310 NFC interface 315, so that the necessary information for conducting the agreed transaction will be exchanged. It should be further noted that the NFC interfaces of the terminal 100 and the POS terminal 310 may include any communication interface suitable for near field communication including RF and optical interfaces two name a couple of non-limiting examples. The necessary information includes at least following communication operations. All of the following operations shall be performed within the set time limit for the transaction that might be different for different embodiments. According to one non-limiting exemplary embodiment, the time limit may be set for 300-400 ms for RFID-based transactions.

First, a mutual authentication (i.e. smart card application in the secure element 300 authenticates the POS 310 and vice versa) is provided for ensuring that the counterparts of the transaction are really what they say they are and no fraudulent authentication step is provided.

Then the POS terminal 310 provides transaction details including the amount of payment and other details regarding the payment to the mobile device. Thereafter, said terminal 100 provides credit card information, for instance, including necessary information for conducting the payment for the amount provided by the POS terminal 310.

Upon successful transaction, the user terminal 100 and/or the POS terminal 310 might provide some kind of notification to the user that the transaction was successfully completed. The user may get the receipt from point of sale printer as usually after the transaction is accepted in paper or electronically (in digital form). The printing may occur, according to embodiments of the present invention also when the user "touches" the NFC interface 315 of the POS terminal 310 provided with a printer second time substantially immediately after the transaction was successfully completed. The transaction information of successful transactions may be stored on the secure smart card element 200 and the POS 310 forwards the transaction information to a service providing authority 340, which completes the transaction. Said forwarding may be provided by means of an existing infrastructure network 350, in form of a PSTN network, a radio network or the like.

After the transaction is completed, the user may select to close (shut down) the secure smart card element 200 by providing such input either through UI or through reading e.g. a corresponding tag. In any case, the predefined timer ensures that the secure smart card element 200 will be closed (shut down) after a short while to reduce risk of hostile readers attacking users secure applications containing sensitive information.

Further, according to embodiments of the present invention, the transaction details provided by the POS terminal 310 might be used to require further security during the transaction. For example, in cases where the amount of payment exceeds a "small transaction amount", which is set to be available for the terminal user without further security, the POS terminal 310 requests the user to provide a dedicated transaction PIN code using the POS terminal user interface (PIN code that is normally used if credit card transactions are done) for ensuring that there is no misuse in connection with the transaction and that the user of the terminal 100 is really authorized for the transaction. Upon providing the necessary PIN code, the POS terminal may continue the transaction and request the terminal 100 to be placed within the communication range of the POS terminal 310 to finish the transaction.

Furthermore, similar operations as presented in connection with the near field transaction embodiment may be used according to embodiments of the present invention wherein a user wants to perform remote payment, for instance, over cellular network 320. Thereby the over the air interface (OTA) of said mobile device is to be used. In comparison with the NFC-based transactions is that a remote payment handle/application is to be implemented within said terminal 100, which enables similar transaction event to be conducted when the switch of the secure smart card element is set to internal communication, for instance. This is required because the data that will be transmitted to a wide-area network needs to be encrypted and modulated prior to the transmission. However, after user has negotiated the transaction details and accepted the amount etc., the secure smart card element is activated and the sensitive information for conducting a remote payment over the wide-area network 320 is provided. When the transaction is completed, the same timer as in NFC embodiment may be used to close the secure smart card element 200.

It should be also noted that the secure smart card element might include also other sensitive applications such as, for example loyalty cards, transportation tickets or the like. As one example, nowadays people have wallets with a number of plastic credit or loyalty or banking cards. The contents of the loyalty cards can be provided to mobile terminal users in electronic format and stored in the smart card module. Each digital card is then separated from each other e.g. by number, valid date, name and issuer or service provider name. Also the representation of the card may be conserved as they have been in these plastic cards. The user and/or POS may select proper cards based on the context and/or profile of the user and/or POS terminal during transaction or based on the selection made by the user. The tickets can be also separated/used depending on the ID of ticket, ticket issuer and/or other ways for fastening the transactions.

Figure 4A:
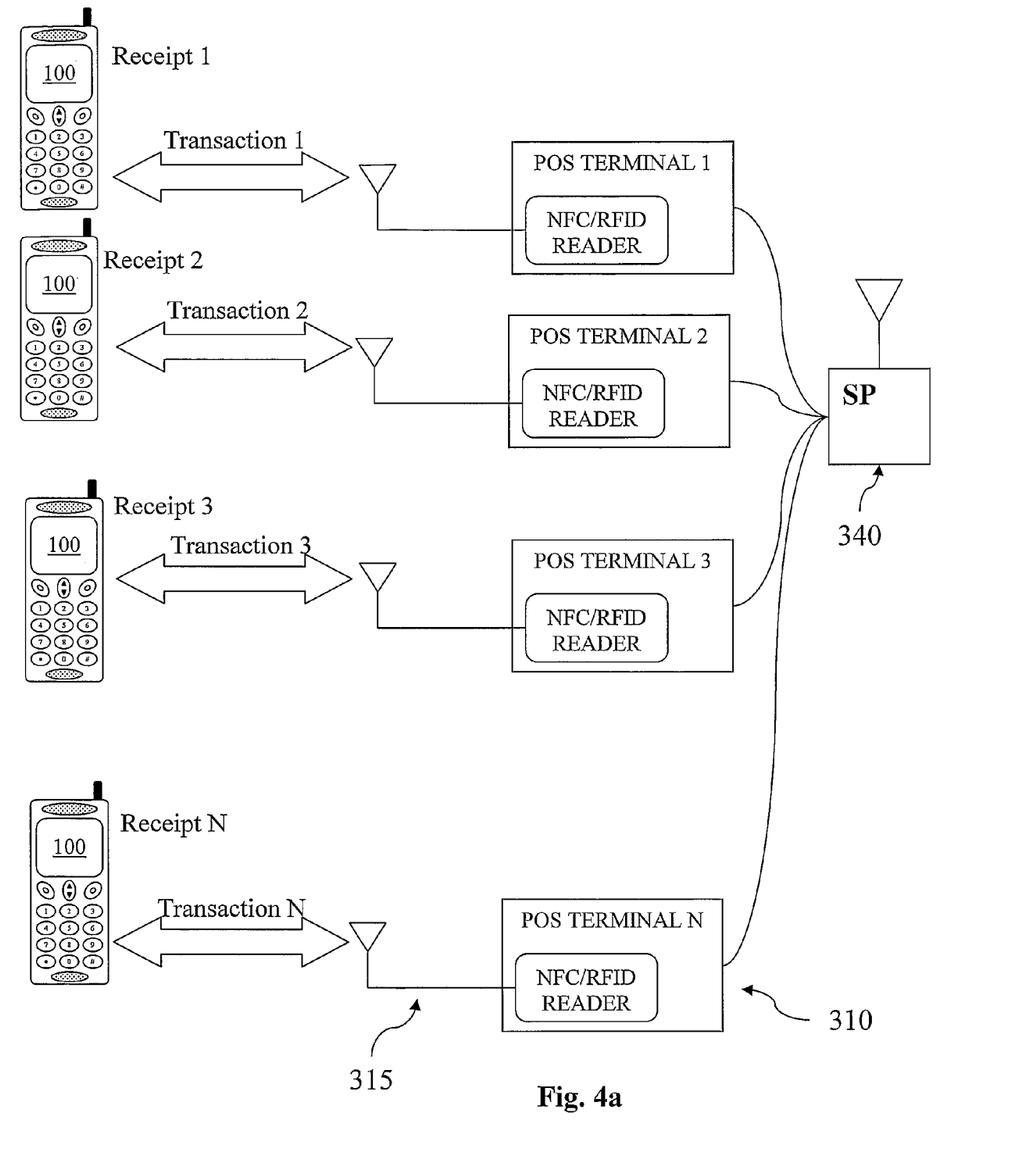
FIG. 4a shows a possible use case of a mobile device adapted to perform the method in accordance with an embodiment of the present invention.

With reference to FIG. 4a a possible use case of a mobile device is illustrated that is adapted to perform the method in accordance with an embodiment of the present invention.

Generally, credit card and banking (debit) card statements are provided to account holders typically monthly on paper or electronically (e.g. in a web browser). The user is supposed to check the statement and complain to the financial organization if some transactions are false, for instance if the amount is wrong or the user has not made the payment at all. As an example, a monthly credit card statement can easily contain 100 transactions, or even more. Some users check the statements against paper receipts that they have saved (e.g. in the wallet) but some users don't want to do this tedious task, they think they just have to rely on the system even if the system is sometimes erroneous. The tediousness is being aggravated by the fact that most credit/debit card holders have several different cards from different issuers causing several statements to appear. On the other hand also the importance of checking the statement because of the risks of card information being compromised has increased with the Internet. The theft of identity is also serious risk.

In accordance with an embodiment of the present invention, account (credit, debit) statements are compared on-line to electronic receipts that were stored in a mobile terminal 100 or that were stored to a server accessible to user via mobile terminal 100 or other computer. The user may easily detect anomalies and differences in time if the statement contains incorrect transactions. This may be provided in real time or at that time when the transaction will be received by an account server, for instance, or whenever a user requests comparison of the performed transactions with the transaction list on the service provider side 340.

Advantageously, the receipt information data contains date, amount, merchant identification, payment instrument identification (e.g. credit card number) and other data. Said data may be used to group and categorize expenses.

FIG. 4a illustrates an example embodiment, wherein a data transaction, for instance a ticketing application, is provided between a mobile terminal 100 and a plurality of POS terminals 310. The respective transactions 1 to N in this example are performed via the NFC interface of the mobile device and POS terminal, respectively. After performing each particular transaction, the mobile terminal 100 will receive a first receipt 1, including receipt information as mentioned above. According to one embodiment of the present invention, the mobile terminal may store this digital receipt 1 in a special storage within the smartcard module. The storage of said smartcard module provides a tamperproof environment and it ensures a secure area for privacy data. However, it should be noted that according to an alternative embodiment of the present invention, the digital receipt information may be stored also in another storage within the mobile terminal. Each time said mobile device conducts a transaction with a POS terminal 310; it will receive a corresponding receipt, Receipt 1 to N. These steps are symbolized in FIG. 4a, transaction 1 to N.

Further, all POS terminals 1 to N are interconnected by means of a service providing entity 340, which also collects the receipts 1 to N according to each mobile terminal. That means, each existing mobile terminal has a corresponding storage directory, for instance, on the service providing side 340. According to the inventive step of the present invention, each receipt 1 to N that was received by the mobile terminal will be stored in a special storage including transaction related data according to said above-mentioned receipt information data.

Furthermore, other possible architectures for maintaining and managing receipts are imaginable.

For instance, according to an embodiment of the present invention, said mobile terminal 100 is adapted to store and manage electronic or digital receipts, respectively. Further, in this embodiment, a financial institution or service providing entity 340 delivers the account statement electronically (e.g. in XML format) to a user personal PC.

Afterwards, the financial management software, which runs on the PC, is trying to find a receipt that corresponds to each line of the statement (based on date, amount, merchant identification, payment instrument identification). Each irregularity will be emphasized on the PC screen, so that a user can realize the statement in a checking mode so that he can easily see for which statement lines there is no corresponding receipt (e.g. these lines are displayed in a different colour). The user can now concentrate checking only those lines. It is also imaginable within the scope of the present invention to provide said checking by means of a mobile terminal 100 having a sufficiently large screen for reading the account statements and viewing/comparing the account statements with receipts stored on the mobile terminal. According to this embodiment of the present invention, the electronic account statement should be delivered to the mobile device 100 directly and the mobile terminal need to be equipped with the financial management software, but on the other hand, this embodiment provides the user with freedom to perform the account statement checking wherever he/she currently is.

Another possible scenario is that the mobile terminal will store the receipts or sends those electronic receipts to a server that handles users' receipts. This may be a service from a bank or another third party. Also in this scenario it is possible that the mobile terminal may be used to view/compare the accounts statements and the receipts by contacting the server.

Also imaginable is checking at real-time, wherein each time an account server, on the POS terminal side 340, receives a new transaction, this transaction is also sent to the third party server/software on user's mobile terminal 100 that tries to match it to existing receipt. If no match is found information is sent to customer. Customer can also define preferences to the server/software like the transaction size and number of the transactions before notification to the user is given. Another possibility is that a user will initiate the comparison manually on said mobile terminal device 100.

As a last embodiment, said electronic receipts 1 to N of each transaction may be sent to a third-party server according to the information provided by the payment instrument or mobile terminal 100, respectively at the time of transaction. Said sending may be performed by POS terminal 310.

Figure 4B:
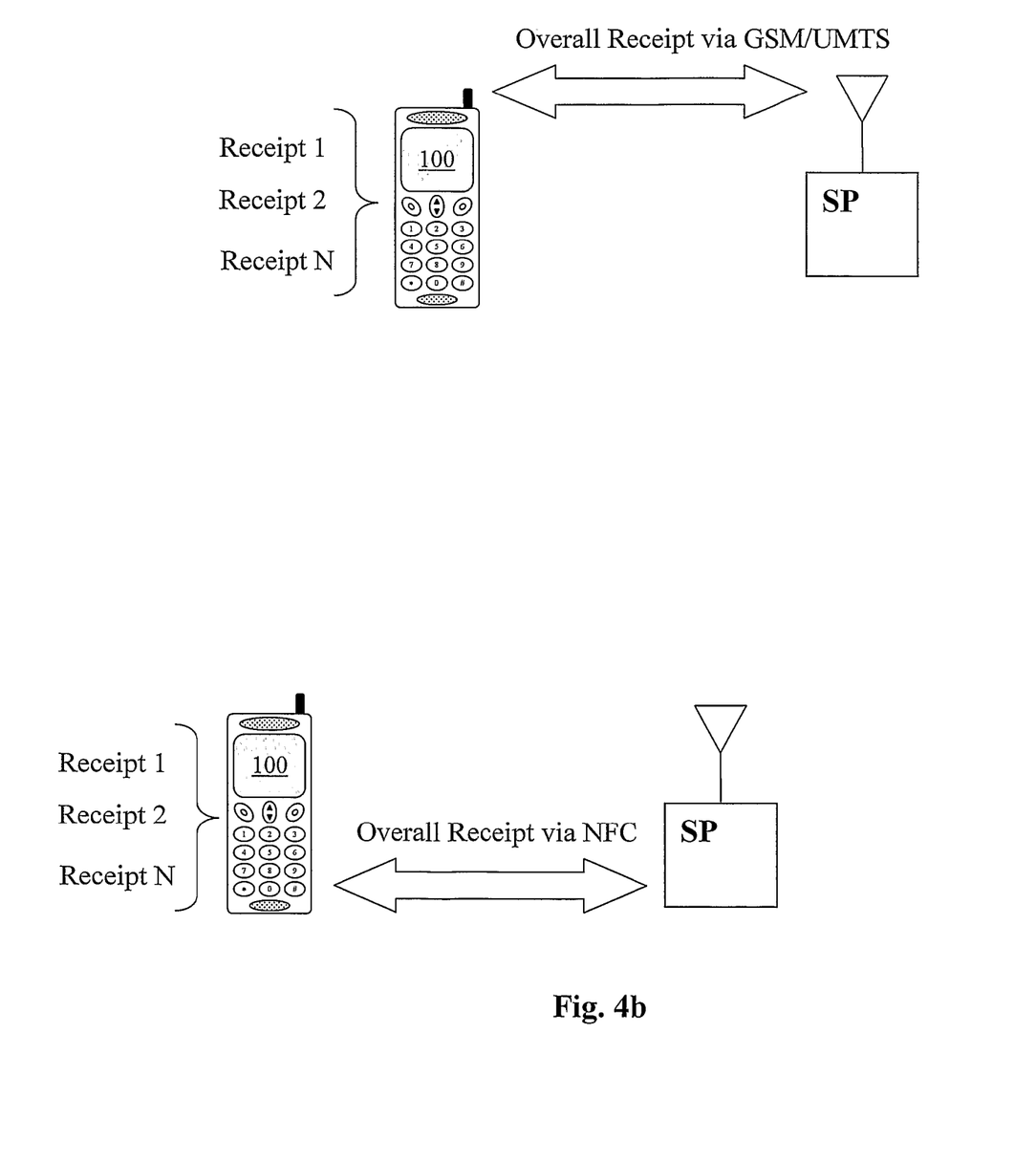
FIG. 4b illustrates two imaginable embodiments of the present invention, wherein said mobile device collects and compares transaction related data with stored data according to the present invention.

FIG. 4b illustrates two imaginable embodiments of the present invention, wherein said mobile device collects and compares transaction related data with stored data according to the present invention. In the upper illustration, with reference to FIG. 4b the mobile terminal device 100 has already received all of the digital/electronic receipts 1 to N corresponding to all previously performed transactions. Said receipts are stored within the mobile device 100 in a tamper-proof storage within the smartcard element 200, for instance. Next a service providing entity (SP) sends a overall receipt to said user device 100. In this case the service providing entity (SP) uses a cellular radio network (GSM/UMTS) for sending, but also other networks are imaginable, such as, for example short-range communication networks and broadcast networks. The overall receipt contains transaction related data, provided by each visited POS terminal 310.

In accordance with the inventive step of the present invention, the mobile device 100 may compare each stored receipt 1 to N with each entry within the received overall receipt. Afterwards the user will be notified if any irregularities were detected.

The lower illustration represents another embodiment of the present invention, wherein said mobile device receives the overall receipt by means of a NFC transmission, which may be initiated by the user of said device. The other steps on the mobile device side are synonym, as described above in accordance with the upper illustration.

Figure 5:
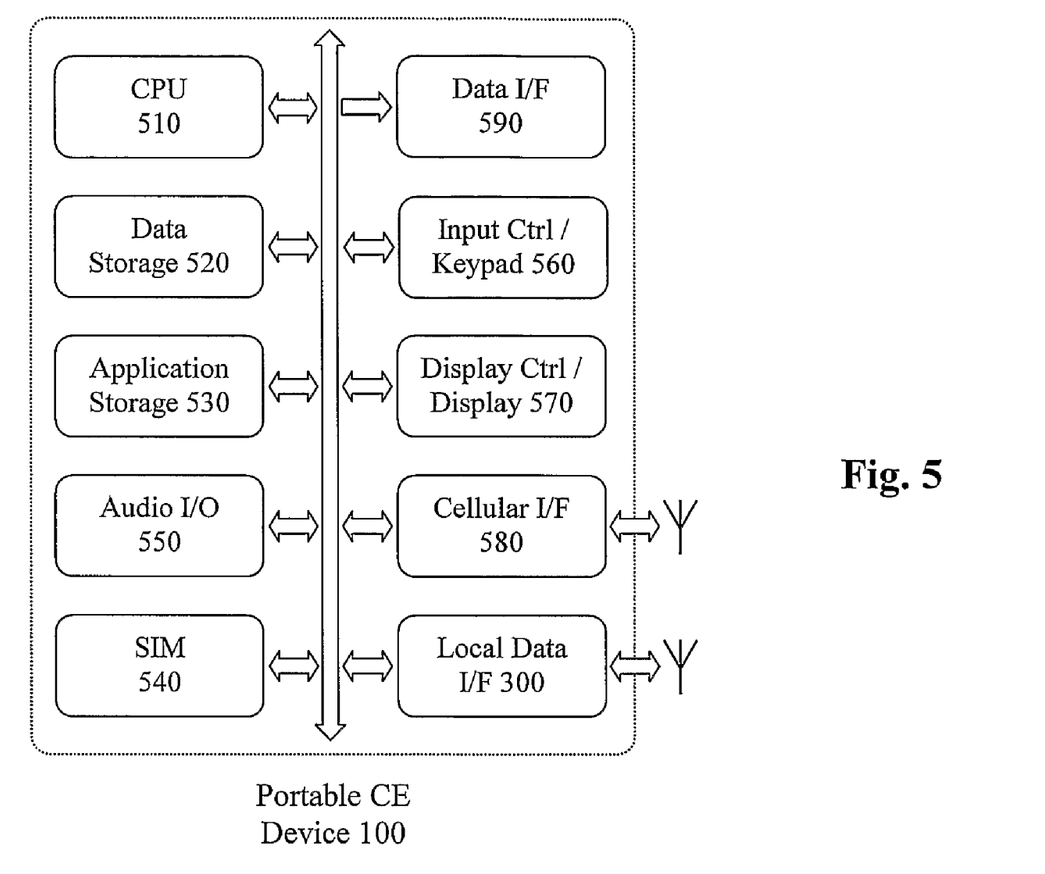
FIG. 5 illustrates schematically a block diagram including functional and structural components of a portable consumer electronic (CE) device according to an embodiment of the present invention.

Finally, with reference to FIG. 5 an introduction to functional and structural components, which may implemented in a portable consumer electronic (CE) device 100 and identification devices operable with embodiments of the inventive concept, will be presented and described in detail.

FIG. 5 illustrates schematically an implementation of a portable consumer electronic (CE) device being equipped with a RFID device according to an embodiment of the present invention. The block diagram of FIG. 5 illustrates a principle structural design of a cellular terminal, which should exemplary represent any kind of portable CE device 100 employable with the present invention. It shall be understood that the present invention is not limited to any specific kind of portable CE device such as that illustrated. The illustrated portable CE device 100 comprises typically a central processing unit (CPU) 510, a data storage 520, an application storage 530, input/output means including audio input/output (I/O) means 550, a keypad with input controller (Ctrl) 560 and a display with display controller (Ctrl) 570.

Additionally, the portable CE device 100 according to an embodiment of the present invention includes a cellular interface (I/F) 580 coupled to a cellular antenna and operable with a corresponding subscriber identification module (SIM) 540. In one embodiment of the invention when integrating the smartcard module into the handheld mobile phone, security is improved as in order to use the mobile phone a PIN input is needed enabling GSM SIM in the mobile phone when the mobile phone is switched on. Thus the mobile phone when switched off or e.g. when activation of phone from screen saver mode a PIN is well protected from violation. According to further embodiments of the present invention, the smartcard module may be integrated in to SIM card of the portable CE device 100 instead of being a separate module. According to further embodiments, the smartcard module may be integrated into a MMC card or memory stick module in connection with the data storage 520 of the portable CE device. Moreover, the portable CE device 100 according to an embodiment of the present invention comprises also a local data interface (I/F) 300 and a general data interface (I/F) 590. However, it should be noted that in embodiments where the smart card module is integrated into certain modules, there needs to be a direct link to the local data interface (I/F) 300 in order to ensure the time requirement for the transaction.

The local (short-range) data interface (I/F) 300 or local (short-range) transceiver may be additionally implemented in portable CE device 100 to provide for local data communication with a corresponding counterpart network, base station or transceiver. In general, the local data interface (I/F) 300 can be realized by a low-power radio frequency (LPRF) transceiver such as a Bluetooth transceiver, a WLAN (wireless local area network) transceiver, an ultra-wide band (UWB) transceiver or any other transceiver operable with an IEEE 802.xx standard. Moreover, the local data interface (I/F) 300 can be also implemented as an infrared-based interface such as an IrDA (infrared direct access) interface or an interface being based on radio frequency identification (RFID) technology, namely RFID reader, RFID transponder and near field communication (NFC) standard, respectively.

The cellular interface (I/F) 580 is arranged as a cellular transceiver to receive signals from the cellular antenna, decodes the signals, demodulates them and also reduces them to the base band frequency. The cellular interface 580 provides for an over-the-air interface, which serves in conjunction with the subscriber identification module (SIM) 540 for cellular communications with a corresponding radio access network (RAN) of a public land mobile network (PLMN). The output of the cellular interface (I/F) 580 thus consists of a stream of data that may require further processing by the central processing unit (CPU) 510. The cellular interface (I/F) 580 arranged as a cellular transceiver also receives data from the central processing unit (CPU) 510, which are to be transmitted via the over-the-air interface to the radio access network (RAN). Therefore, the cellular interface (I/F) 580 encodes, modulates and converts the signal to the radio frequency, which is to be used. The cellular antenna then transmits the resulting radio frequency signal to the corresponding radio access network (RAN) of the public land mobile network (PLMN).

In addition to the local data interface (I/F) 300 and the general data interface (I/F) 590, the portable CE device may include in certain embodiments of the present invention, a broadcast receiver interface (not shown), which allows the portable CE to access broadcast transmission services that include Digital Video broadcasting (DVB-T, DVB-H), Digital Audio Broadcasting (DAB), Digital Radio Mondiale (DRM), Integrated Services Digital Broadcasting-Terrestrial (ISDB-T), Advanced Television Systems Committee (ATSC) and Digital Multimedia Broadcasting (DMB-T) techniques to name a few.

The display and display controller (Ctrl) 570 are controlled by the central processing unit (CPU) 510 and provides information for the user typically by the means of a user interface. The keypad and keypad controller (Ctrl) 560 are provided to allow the user to input information. The information input via the keypad is supplied to the central processing unit (CPU) 510, which may be controlled in accordance with the input information. The audio input/output (I/O) means 550 includes at least a speaker for reproducing an audio signal and a microphone for recording an audio signal. The central processing unit (CPU) 510 may control the conversion of audio data to audio output signals and the conversion of audio input signals into audio data, where the audio data have a suitable format for cellular transmission.

The data interface (I/F) 590 serves for interfacing data and instruction communications between the local data interface module 300 and the portable CE device 100. The data interface (I/F) 590 may be established by any appropriate hardware and/or software interfaces, which are available in the state of the art or in future.

The portable CE device 100 further comprises a protected memory 300, which is adapted for storing a plurality of data records, for instance within said smartcard module 200. As defined above, each data record shall be understood as a digital representation of information relating to for instance digital ticket data and digital payment data according to an embodiment of the present invention. The protected memory 300 is specifically adapted to meet requirements, which have to be considered to ensure security and privacy aspects relevant in view of the sensitive digital information stored therein. Those skilled in the art will appreciate that the handling of the sensitive digital information such as digital ticket data and digital payment data as defined above is subjected to security and privacy aspects from user view as well as from service provider view, where the service provider relates to both issuing authorities and accepting authorities of the digital information in question.

In general, the portable CE device 100 described above may anyone of the example devices comprising illustratively a portable phone, a personal digital assistant, a pocket personal computer, a portable personal computer, a communicator terminal or any other portable consumer electronics (CE) with processing capability and appropriate communication means; i.e. comprising at least a smartcard module 200 and a NFC module 210. In general the portable CE device 100 embodies a processor-based device, which allows implementation of the inventive concept. The following embodiment will illustrate enhanced identification device operation, which is for instance implementable in each of the aforementioned consumer electronic (CE) devices. However, illustration of the identification device will be given with respect to illustrated portable CE device 100, which has attached or has embedded such an identification device. But it shall be noted that the invention is not specifically limited to those identification devices and to portable CE device coupled thereto, respectively, which are herein illustrated merely for the way of illustration on the basis of embodiments according to the present invention.

Figure 6:
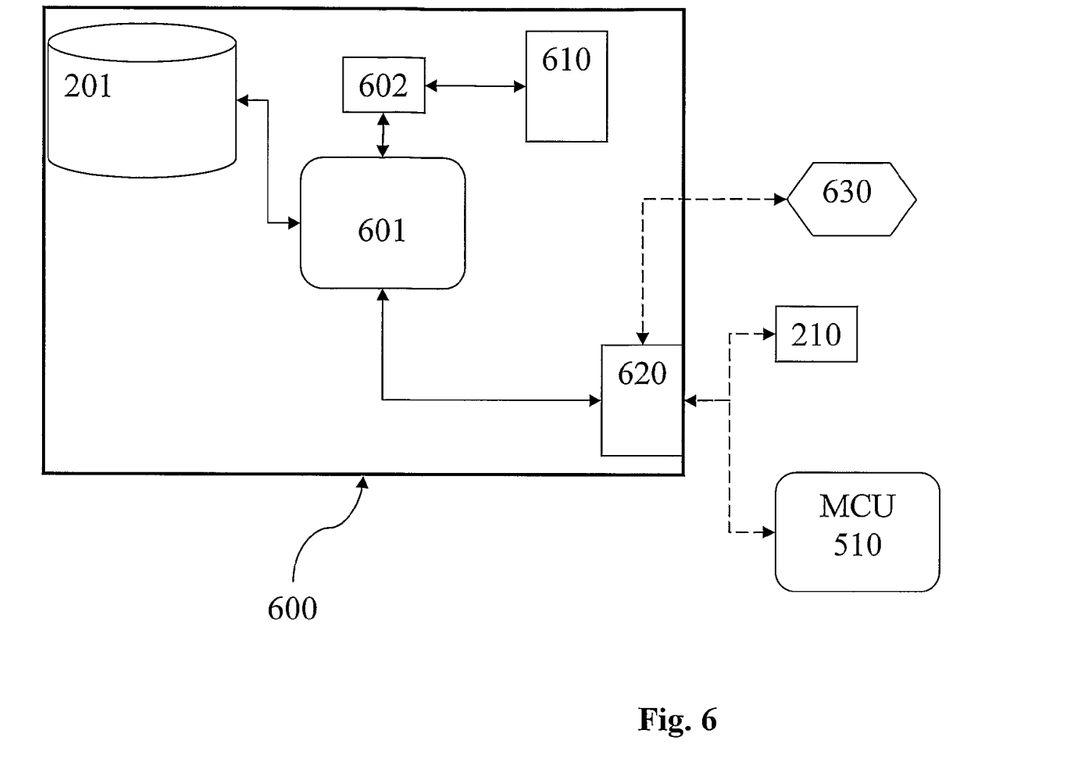
FIG. 6 shows a smartcard module in accordance with the present invention.

FIG. 6 depicts a smartcard module 600 in accordance with the present invention. Said module may be controlled by a smartcard control unit 601, that is used to control operation of said smartcard module 600. It is imaginable that the CPU of said mobile terminal device adopts the functionality of said control unit 601 so that said smart card control unit may be omitted. Said smartcard module 601 may comprise a secure storage area 201 which serves as storage means in a tamper-proof area.

The first interface 610, which may be controlled by a clock module 602, is a power on interface that is adapted to turn said smartcard module 600 on or off. The clock module 602, and thus said first interface 610 may be controlled by the control unit 601 or alternatively by said mobile terminal device control unit 510.

Said smartcard module 600 is additionally provided with a second interface module 620, which may interconnect with the smartcard control unit 601 and with a certain application as well. Pleas note, that the application may interconnect said second interface 620 via the device MCU 510 or the like. On the basis of the application 630 input the second interface 620 is able to switch between a mobile terminal control unit 510 and a NFC interface 210. The description of said NFC interface 210 may be found with reference to FIG. 2.

Further, it is imaginable that said smartcard module 600 may be embedded within a mobile terminal device 100.

It is obvious for those skilled in the art that as the technology advances, the inventive concept can be implemented in a broad number of ways. The invention and its embodiments are thus not limited to the examples and specific embodiments described above but may vary within the scope of the claims.

The invention claimed is:

1. A method, comprising:
    starting a smartcard application on an apparatus;
    in response to said starting of said smartcard application, activating a smartcard module in said apparatus;
    determining whether said started smartcard application is an external application for performing data transactions with external entities or said started smartcard application is an internal application for performing internal communications in said apparatus; and
    switching a connection between said smartcard module and a near field communication module in said apparatus in case of an affirmative determination of said external application, whereby said near field communication module is configured for providing a wireless near field communications interface to said smartcard module for conducting wireless data transactions with an external entity, and switching a connection between said smartcard module and a central processing unit of said apparatus in case of no affirmative determination of said external application.

2. The method of claim 1, further comprising:
    switching a connection between said smartcard module and a wide-area networking module in said apparatus in case of an affirmative determination of said external application via said wide-area networking module.

3. The method of claim 1, wherein said activating of said smartcard module is based on performing an authorization step for activating functionality of said smartcard module.

4. The method of claim 3, wherein said authorization step is based on user input.

5. The method of claim 1, wherein said activated smartcard module is accessible only for a predefined time.

6. The method of claim 1, wherein said activating of said smartcard module is based on user input by means of a graphical user interface (GUI).

7. The method of claim 1, wherein said connection between said smartcard module and said near field communication module is disabled if said smartcard application corresponds to an internal application.

8. The method of claim 1, wherein said activating of said smartcard module is automatically provided by means of a mobile terminal control unit (MCU).

9. The method of claim 1, wherein said starting of said smartcard application is provided depending on an environment of said apparatus.

10. The method of claim 1, wherein said data transactions are wireless data transactions with a second party, wherein said transactions are provided in a near field communication environment.

11. The method of claim 10, wherein performing of said wireless data transactions further comprises receiving notification from said second party and sending acknowledgement data to said second party, both corresponding to a wireless data transmission.

12. The method of claim 10, further comprising the steps of:
    obtaining at least one digital receipt corresponding to each said wireless data transaction executed with said second party;
    storing said at least one digital receipt in a storage;
    collecting all digital receipts during a predetermined time period in said storage;
    receiving an overall digital receipt from a service providing party, wherein said overall digital receipt is accumulated by said service providing party during said predetermined time period; and
    comparing said collected digital receipts with said received overall digital receipt from a service providing party.

13. The method of claim 12, wherein said digital receipt and said overall digital receipt comprise at least one of date and time information data, credit card balance data, shopping receipts in connection with a certain merchant or the like.

14. The method of claim 12, wherein said comparing is provided for each transaction on a real time basis.

15. The method of claim 12, further comprising forwarding said received overall digital receipt and said collected digital receipts to another entity.

16. The method of claim 1, further comprising:
    activating the smartcard module by means of a mobile terminal control unit coupled to the near field communication module in said apparatus, when said apparatus is proximate to a point of sale terminal.

17. A non-transitory computer program product, comprising:
    a computer useable medium having computer program logic recorded thereon for execution by a processor;
    program code in said medium for enabling the processor to start a smartcard application on an apparatus;
    program code in said medium for enabling the processor in response to said starting of said smartcard application, to activate a smartcard module in said apparatus;
    program code in said medium for enabling the processor to determine whether said started smartcard application is an external application for performing data transactions with external entities or said started smartcard application is an internal application for performing internal communications in said apparatus; and
    program code in said medium for enabling the processor to switch a connection between said smartcard module and a near field communication module in said apparatus in case of an affirmative determination of said external application, whereby said near field communication module is configured for providing a wireless near field communications interface to said smartcard module for conducting wireless data transactions with an external entity, and switch a connection between said smartcard module and a central processing unit of said apparatus in case of no affirmative determination of said external application.

18. An apparatus, comprising:
a smartcard module;
a near field communication module;
a central processing unit, coupled to the near field communication module, configured to start a smartcard application, resulting in activation of the smartcard module, said central processing unit further configured to determine whether said started smartcard application is an external application for performing data transactions with external entities or said started smartcard application is an internal application for performing internal communications in the apparatus; and
a switch coupled to the central processing unit, configured to switch a connection between said smartcard module and a near field communication module in the apparatus in case of an affirmative determination of said external application, whereby said near field communication module is configured to provide a wireless near field communications interface to said smartcard module for conducting wireless data transactions with an external entity, and to switch a connection between said smartcard module and a central processing unit of the apparatus in case of no affirmative determination of said external application.

19. The apparatus of claim 18, wherein said smartcard module is only accessible after user authentication and for a certain period of time.

20. A mobile terminal device, comprising:
a processor;
a smartcard module;
a Near Field Communication module;
a memory including executable instructions, the memory and the executable instructions being configured to, in cooperation with the processor, cause the mobile terminal device to perform at least the following:
start a smartcard application on said mobile terminal device;
activate said smartcard module in response to said starting of said smartcard application;
determine whether said started smartcard application is an external application for performing data transactions with external entities or said started smartcard application is an internal application for performing internal communications in said mobile terminal device; and
switch a connection between said smartcard module and said near field communication module in case of an affirmative determination of said external application, whereby said near field communication module is configured for providing a wireless near field communications interface to said smartcard module for conducting wireless data transactions with an external entity, and switch a connection between said smartcard module and a mobile controlling unit of said mobile terminal device in case of no affirmative determination of said external application.

21. The mobile terminal device of claim 20, wherein said smartcard module is only accessible after user authentication and for a certain period of time.

22. The mobile terminal device of claim 20, further comprising:
a wide-area networking module;
wherein the memory and the executable instructions being configured to, in cooperation with the processor, cause the mobile terminal device to further perform at least the following:
switch a connection between said smartcard module and said wide-area networking module in case of an affirmative determination of said external application via said wide-area networking module.

23. The mobile terminal device of claim 20, wherein the memory and the executable instructions being configured to, in cooperation with the processor, cause the mobile terminal device to further perform at least the following:
obtain at least one digital receipt corresponding to each said wireless data transaction executed with said second party;
store said at least one digital receipt in a storage;
collect all digital receipts during a predetermined time period in said storage;
receive a overall digital receipt from a service providing party, wherein said overall digital receipt is accumulated by said service providing party during said predetermined time period; and
compare said collected digital receipts with said received overall digital receipt from a service providing party.

24. The mobile terminal device of claim 20, further comprising a clock module configured to control all time oriented events within said device.

25. The mobile terminal device of claim 20, further comprising a telecommunications module configured to connect to a cellular radio network for receiving the overall digital receipt from a service providing party.

26. The mobile terminal device of claim 20, further comprising a receipt storage embedded within said smartcard module, configured to store transaction related data.

27. Wireless data transaction system, comprising:
at least one mobile terminal device, comprising:
a smartcard module;
a Near Field Communication module;
a memory module;
means for starting a smartcard application on said mobile terminal device;
means for, in response to said starting of said smartcard application, activating of said smartcard module;
means for determining whether said started smartcard application is an external application for performing data transactions with external entities or said started smartcard application is an internal application for performing internal communications in said mobile terminal device;
means for switching a connection between said smartcard module and said near field communication module in said mobile terminal device in case of an affirmative determination of said external application, whereby said near field communication module is configured for providing a wireless near field communications interface to said smartcard module for conducting wireless data transactions with an external entity, and for switching a connection between said smartcard module and a mobile controlling unit of said mobile terminal device in case of no affirmative determination of said external application;
a mobile controlling unit interconnecting said smart card module, said near field communication module and said memory module, wherein said mobile controlling unit is adapted for controlling operation of said mobile device; and
a plurality of external entities;

wherein said mobile terminal devices provide bidirectional data transactions with said external entities.

28. An apparatus, comprising:
means for starting a smartcard application;
means for, in response to said starting of said smartcard application, activating a smartcard module in the apparatus;
means for determining whether said started smartcard application is an external application for performing data transactions with external entities or said started smartcard application is an internal application for performing internal communications in the apparatus; and
means for switching a connection between said smartcard module and a near field communication module in the apparatus in case of an affirmative determination of said external application, whereby said near field communication module is configured for providing a wireless near field communications interface to said smartcard module for conducting wireless data transactions with an external entity, and switching a connection between said smartcard module and a central processing unit of the apparatus in case of no affirmative determination of said external application.

29. A non-transitory computer program product representing instructions, which when executed by a processor, cause an apparatus to perform the steps comprising:
starting a smartcard application;
in response to said starting of said smartcard application, activating a smartcard module in said apparatus;
determining whether said started smartcard application is an external application for performing data transactions with external entities or said started smartcard application is an internal application for performing internal communications in said apparatus; and
switching a connection between said smartcard module and a near field communication module in said apparatus in case of an affirmative determination of said external application, whereby said near field communication module is configured for providing a wireless near field communications interface to said smartcard module for conducting wireless data transactions with an external entity, and switching a connection between said smartcard module and a central processing unit of said apparatus in case of no affirmative determination of said external application.

* * * * *